United States Patent [19]

Akao et al.

[11] Patent Number: 4,730,778
[45] Date of Patent: Mar. 15, 1988

[54] CONTAINER FOR ROLL OF LIGHT-SENSITIVE STRIP MATERIAL

[75] Inventors: Mutsuo Akao; Yoshihiro Nishiyama, both of Kanagawa, Japan

[73] Assignee: Fuji Photo Film Co., Ltd., Kanagawa, Japan

[21] Appl. No.: 909,470

[22] Filed: Sep. 19, 1986

[30] Foreign Application Priority Data

Sep. 19, 1985 [JP] Japan .......................... 60-143255[U]
Dec. 4, 1985 [JP] Japan .......................... 60-186114[U]

[51] Int. Cl.⁴ .................. B65H 16/06; G03B 1/02; G03B 17/26
[52] U.S. Cl. ................................ 242/68.7; 206/389; 206/409; 242/71; 242/71.1; 242/71.7
[58] Field of Search .............. 242/68, 68.7, 71, 71.1, 242/71.7, 71.8; 206/389, 408, 409

[56] References Cited

U.S. PATENT DOCUMENTS

| 2,484,225 | 10/1949 | Herzig ........................... 242/71.1 X |
| 3,333,785 | 8/1967 | Baur et al. ......................... 242/71.1 |
| 3,404,613 | 10/1968 | MacGregor et al. ............... 242/71.1 |
| 3,408,909 | 11/1968 | Kisselmann et al. ................. 242/71 |
| 4,034,929 | 7/1977 | Ebner, Jr. ........................... 242/71.1 |

FOREIGN PATENT DOCUMENTS

| 46-20539 | 7/1971 | Japan . |
| 54-36924 | 3/1979 | Japan . |
| 55-87525 | 6/1980 | Japan . |
| 55-88980 | 6/1980 | Japan . |
| 55-31542 | 7/1980 | Japan . |
| 55-113543 | 8/1980 | Japan . |
| 55-124140 | 9/1980 | Japan . |
| 57-128333 | 8/1982 | Japan . |
| 57-190948 | 11/1982 | Japan . |

Primary Examiner—John Petrakes
Attorney, Agent, or Firm—Burns, Doane, Swecker & Mathis

[57] ABSTRACT

A container for a roll of a light-sensitive strip material having an opening for drawing out the light-sensitive strip material where teremp cloth is provided, which is characterized in that ground fabric structure of the teremp cloth is a knit structure and more than 20% of the pile yarns are looped.

In the teremp cloth used for the container of the invention, each pile yarn winds around the warp or the weft of the ground fabric and fraying or falling out of pile yarn does not occur. Generation of pile yarn dust during manufacturing process is minor, and trouble with exposure and development caused by adhesion of pile yarn dust is solved even under high temperature and high humidity conditions.

18 Claims, 13 Drawing Figures

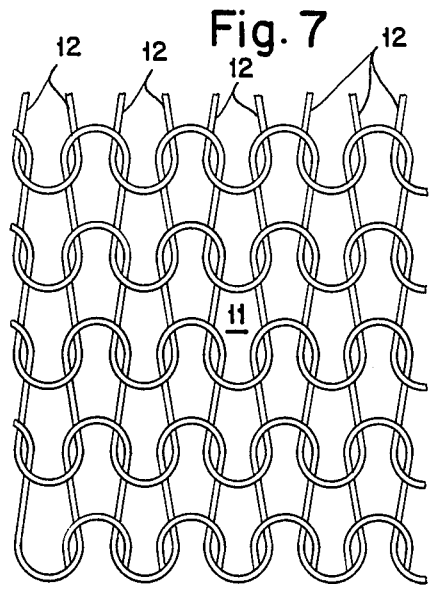
Fig. 7
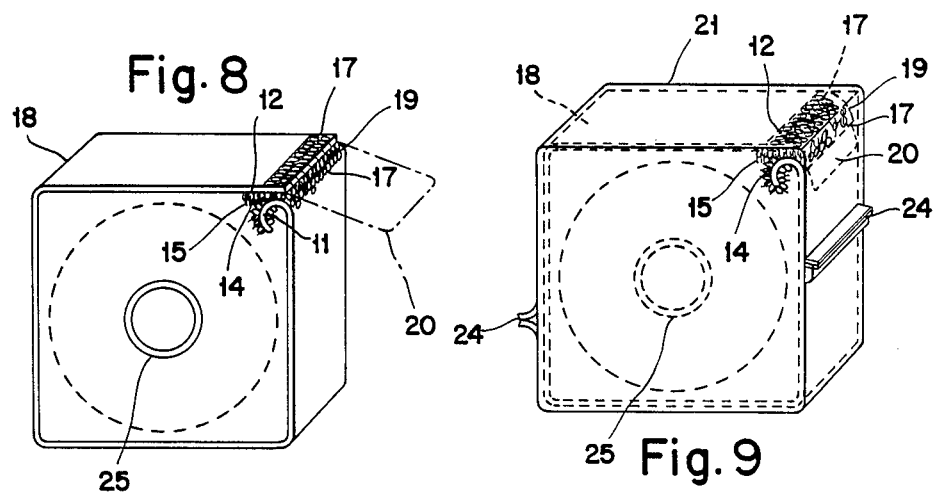
Fig. 8
Fig. 9
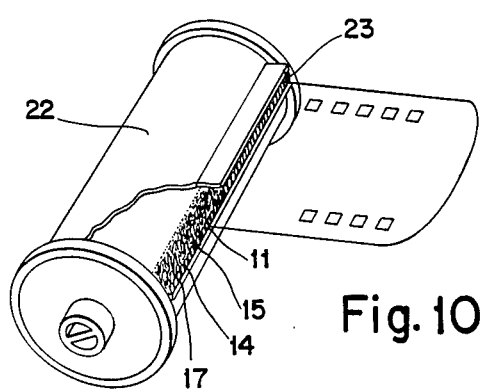
Fig. 10

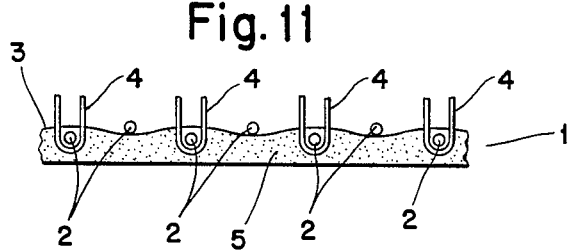
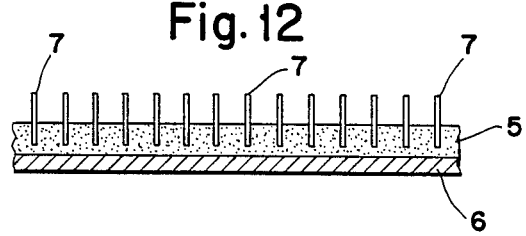
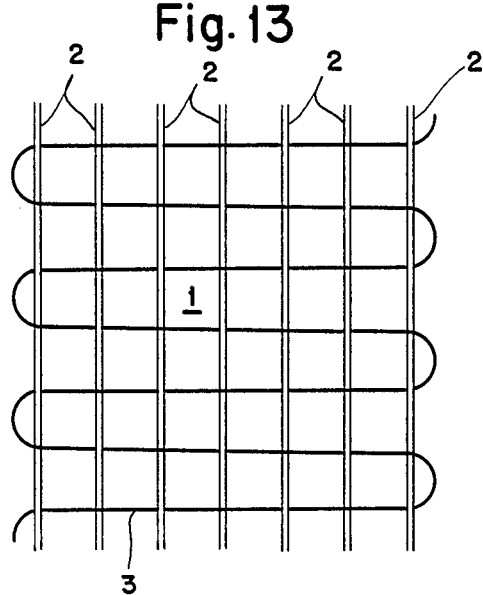

CONTAINER FOR ROLL OF LIGHT-SENSITIVE STRIP MATERIAL

BACKGROUND OF THE INVENTION

1. Field of the Invention

This invention relates to a container for a roll of light-sensitive strip material such as photographic roll film or a roll of photographic paper. More particularly, this invention relates to a lightproof container having an opening through which the light-sensitive strip material is drawn and where teremp cloth is provided.

2. Description of Prior Art

As the container for a roll of a light-sensitive strip material, various types have been disclosed in Japanese Patent KOKAI Nos. 54-36924, 55-124140, 57-128333 and 57-190948, Japanese Utility Model KOKAI Nos. 55-87525, 55-88980 and 55-113543 and Japanese Utility Model KOKOKU Nos. 46-20539 and 55-31542.

For example, a lightproof container for a roll of photographic photosensitive material capable of loading easily under room light was proposed in Japanese Utility Model KOKAI No. 55-113543. This container was a kind of magazine having a slit through which a photographic photosensitive strip material was drawn, and in order to ensure that the container was lightproof, a foamed pad or felt pad was provided to the slit.

A light-shielding member is generally provided at the slit of a container for a light-sensitive strip material in order to prevent the light-sensitive strip material inside the container from being exposed to the light leaked from the slit or drawing out part. Various light-shielding members are known, and among these, the light-shielding members mainly composed of a cloth called teremp cloth. This teremp cloth is widely employed because scratches are not formed on the face of the strip material as it is drawn out from the slit.

An example of conventional teremp cloth disclosed in Japanese Utility Model KOKOKU No. 46-20539 is shown in FIG. 11. The teremp cloth was composed of a woven ground or base fabric 1 and coreless pile yarn 4 woven thereinto. The ground fabric 1 was formed by weaving the warp 2 and the woof 3 in a manner as shown in FIG. 13. The coreless pile yarn 4 was formed from a soft raw yarn such as viscose yarn or acetate yarn by crimp processing, and the ground fabric 1 was impregnated with an adhesive material 5 for filling in order to fix or attach the pile yarn 4. Generally, such a teremp cloth was manufactured first by weaving the warp 2 and the woof 3 together with the entangling pile warp yarn 4 therein to form double velvet type of material and then cutting the loop.

Another example of conventional teremp cloth disclosed in Japanese Patent KOKAI No. 57-190948 is shown in FIG. 12. This teremp cloth was manufactured by providing an adhesive material 5 layer on a base material 6 of the container, such as a metal plate and then setting the short fibers 7 electrostatically in the adhesive material.

Furthermore, it is also known that short fiber is directly set in thermoplastic resin provided in the opening or slit to ensure the interior of the container as being lightproof (Japanese Patent KOKAI No. 57-190948).

However, in the case of the conventional teremp cloth as shown in FIG. 11, pile yarn 4 will fray or fall out during manufacturing of the teremp cloth and during the drawing out of the light-sensitive strip material through the slit. Dust from the pile yarn adheres on the surface of the light-sensitive material and causes trouble in exposure and development of the light sensitive material. In addition, it is necessary to arrange the orientation of pile yarn so as to prevent meandering movement of the light-sensitive material during its drawing out through the slit of the container. It is also a problem that the conventional teremps cloth manufacture process is complicated and manufacturing cost is expensive. Particularly, in the case of the container for a roll of photographic color printing paper capable of being loaded in a light room, adhesion of pile yarn dust is a serious problem under high temperature and high humidity conditions because of increasing adhesion of gelatin or adhesive material layer.

In the case of the conventional teremp cloth shown in FIG. 12, a major problem is the falling out of the pile yarn. Accordingly, the conventional teremp cloth is impractical.

The above problems of the teremp cloths are considered to be improved by utilizing pile knit (raising knit) which is a pile texture of knitted fabric. However, even in this case, the pile yarn is liable to fall out. In order to improve fixation of pile yarn use is made of highly shrinkable yarn as ground yarn to constrict the stitching by heat treatment or by using an adhesive. Tips of the pile yarns are extended by using special yarn capable of bulking by heat treatment. However, waste pile yarn formed during raising and shearing remains in the plush. Such waste adheres on the surface of the light-sensitive strip material.

SUMMARY OF THE INVENTION

It is an object of the invention to provide a container for a roll of a light-sensitive strip material which does not permit exposure and development of the material caused by adhesion of pile yarn dust.

It is another object of the invention to provide a container for a roll of a light-sensitive strip material which does not permit meandering movement of the light-sensitive strip material as it is drawn through the slit.

It is still another object of the invention to provide a container for a roll of a light-sensitive strip material of which teremp cloth can be manufactured easily and inexpensively.

The present invention provides a container for a roll of a light-sensitive strip material which has achieved the foregoing objects. Such a container has an opening for drawing out the light-sensitive strip material where teremp cloth is provided, and the teremp cloth is a knit structure with more than 20% of pile yarns are looped.

BRIEF DESCRIPTION OF THE DRAWINGS

FIG. 7 is a schematic plan view illustrating a knit structure.

FIGS. 8 to 10 are perspective views of containers embodying the invention.

FIGS. 11 and 12 are schematically illustrated sectional views of teremp cloths used for conventional containers.

FIG. 13 is a schematic plan view illustrating a woven structure.

DETAILED DESCRIPTION OF THE INVENTION

The teremp cloth applicable to the container of the invention is characterized in that more than 20% of the pile yarn is looped. The remaining pile yarn is opened or sheared to form a fluff surface. In order to maximize prevention of pile yarn dust generation, it is preferable that all pile yarns are looped. However, such looped pile is inferior to fluffed pile in softness and light-shielding. Moreover, when all pile yarns are formed in a loop, directionality appears to permit meandering movement of the light-sensitive material. Therefore, the pile yarns are preferably formed as a mixture of loops and fluffs. A suitable ratio of looped piles is in the range of 90% to 20% or conversely, a ratio of fluffed piles is 10% to 80%. A preferable ratio of looped piles is in the range of 80% to 40%. The looped piles and fluffed piles are preferably arranged uniformly. The fluffed piles are preferably formed taller than the looped piles in a semi-cut pile. In this case, fluffed piles are at the surface portion, and both looped piles and fluffed piles are at the inner portion. By this structure, the falling out of pile yarn, softness, light-shielding properties, etc. are improved.

The structure of ground fabrics is a knit structure which includes woven material which is generally a double weave such as warp backed knit or weft backed knit. The above piles may be formed either by warp yarn or by weft yarn. The ground fabric may be set with heat or impregnated with an adhesive material for filling in order to prevent deformation of the teremp cloth.

Preferable material of the yarn forming the teremp cloth is a synthetic fiber of a thermoplastic resin such as nylon fiber, acrylic fiber, polyester fiber, vinylon (polyvinyl alcohol) fiber, vinyl chloride fiber, vinyl chloride-vinylidene copolymer fiber, polypropylene fiber, polyethylene fiber and polycarbonate fiber. These fibers are superior to natural fibers in terms of being capable of cutting by fusing by heat-slitting or supersonic-slitting without forming a fray or having frayed and at the cut portion. Other superiorities of these fibers are uniform quality, small hygroscopicity, good heat setting quality after raising, physical strength, etc. However, other synthetic fibers, such as rayon fiber and acetate fiber as well as natural fibers such as cotton fiber and silk fiber may be used or blended with the thermoplastic resin fiber according to the required properties. The teremp cloth may be composed of two or more kinds of yarns.

The teremp cloth of the invention should be colored with a dye or a pigment in order to secure or further improve light-shielding properties. Preferably, the color is a dark color, and black is the most preferable.

Several embodiments of the teremp cloth applicable to the container of the invention are schematically illustrated in FIGS. 1 to 4.

Figure 1:
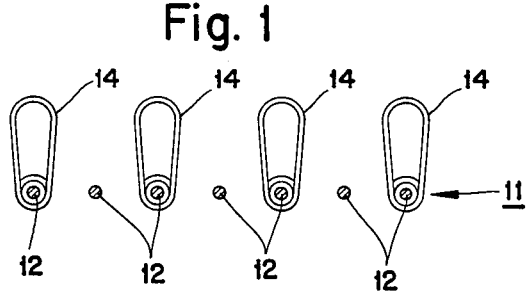
FIGS. 1 to 4 are schematically illustrated sectional views of teremp cloths used for containers of the invention.
Figure 2:
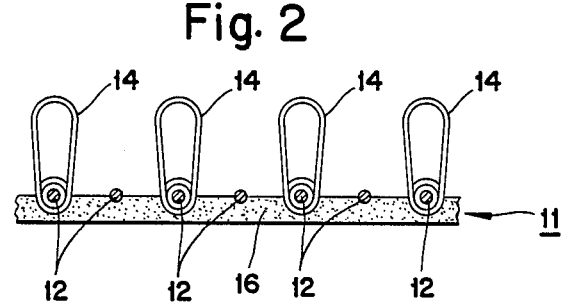
Figure 3:
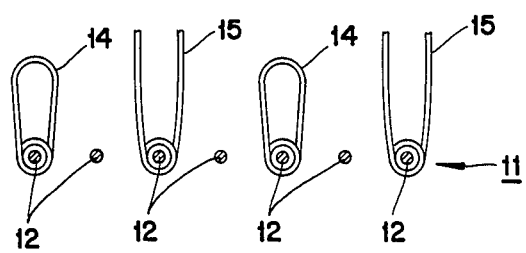
Figure 4:
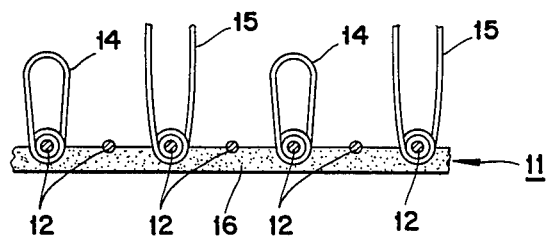

The embodiment of FIG. 1 shows the pile yarn 14 being knitted to or around warp 12 of the warp knitted fabric of the type shown in FIG. 7 so as to form a loop or loops. In the embodiment of FIG. 2, the ground fabric 11 of the teremp cloth, as defined above, of FIG. 1 is impregnated with an adhesive material 16 for filling or as a filler for the ground fabric in order to prevent deformation of the teremp cloth. In the embodiment of FIG. 3, looped pile 14 and fluffed pile 15 line alternate along a line of the pile with the number of looped piles being equal to the number of fluffed piles. As can be seen, the ends of the fluffed piles project above the looped piles. In the embodiment of FIG. 4, the ground fabric 11 of the teremp cloth of FIG. 3 is further impregnated with an adhesive material 16 for filling, i.e., as a filler for the ground fabric.

When teremp cloth of the invention is manufactured a knitted fabric having looped piles projected therefrom is first formed.

Such a knitted fabric may be prepared either from weft knitted fabric such as circularly knitted fabric and flatly knitted fabric or from warp knitted fabric such as tricot fabric, raschel fabric and milanese fabric by raising the fabric to form looped piles. On the other hand, the knitted fabric having looped piles may be directly formed by using a circular knitting machine or a circular hosiery knitting machine. These methods are explained in detail in "Seni Kogaku" vol. 33, No. 7, pp. 390–397 (1980).

Particularly preferable knitted fabrics are sinker pile teremp cloths formed by using a circular knitting machine and French pile teremp cloths knitted by using a tricot warp knitting machine. Subsequently, the weft of the knitted fabric is drawn out by needles to form loops. They are made of the yarn containing more than 50% of polyester fiber, acrylic fiber, or nylon fiber colored black.

When all pile yarns of the teremp cloth are looped, the teremp cloth may be used for the container of the invention as it is. On the other hand, when a part of pile yarns are opened, such pile yarns are, for example, raised and then sheared to a definite length between the longest pile and the shortest pile. Since pile yarns have usually a distribution in length, the ratio of fluffed piles can be controlled by controlling the shearing length. In this regard, the knitted fabric, particularly the warp knitted fabric, of which the loops are formed by drawing or pulling out by needles is preferable because of having a suitable length distribution of the loops.

In the container of the invention, the teremp cloth is provided at the opening slit of the package through which the light-sensitive strip material is drawn out and for the shielding light. The type of light-sensitive strip material is not limited and includes photographic printing paper, printing paper for computerized type-setting system and photographic film such as JIS 135-type. Known structures of containers may be used with the teremp cloth of the present invention.

The teremp cloth may also be provided by any known method. For example, any suitable adhesive is applied on the pasting position, and the teremp cloth cut into a prescribed size is struck thereon. As another method, a hot-melt adhesive is applied on the teremp cloth to which a filling material has been previously coated, and cut into a prescribed size. Then, this piece is placed on the pasting position, and subjected to heat, i.e., a supersonic wave or a high-frequency wave. A piece of the teremp cloth may be stuck by using an adhesive material for filling or a double face adhesive tape. The double face adhesive tape is suitable for use in conjunction with a container which is made of not so rigid or deformable material such as paper board and corrugated board.

A foamed sheet as disclosed in Japanese Patent KOKAI No. 59-201848, a foamed coating layer or an elastic sheet may preferably provided between a face of the body of the container and the teremp cloth. For example, utilization of the double face adhesive tape composed of a foamed sheet of which both faces are coated with an adhesive is preferable.

In the teremp cloth used for the container of the invention, each pile yarn winds round the warp or the weft of the ground fabric, and therefore, the pile yarn will not fray or fall out. Generation of pile yarn dust during the manufacturing process is minor, and trouble due to exposure and development caused by adhesion of pile yarn dust is solved even under high temperature and high humidity conditions. The teremp cloth is inexpensive, and the speed of manufacture is several times higher than the conventional teremp cloth. When piles of the teremp cloth are a mixture of looped piles and fluffed piles, the softness and light-shielding qualities are good and meandering movement of the light-sensitive material does not occur.

EXAMPLES

Example 1

A light-shielding teremp cloth having the structure of FIG. 3 was manufactured.

Figure 6:
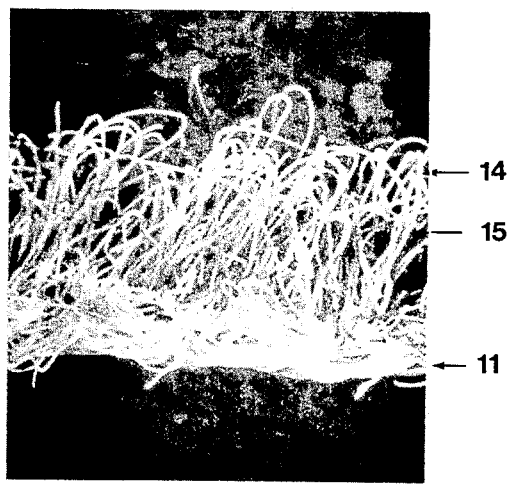

The warp 12 of 50 denier black polyester yarn and the weft of 50 deniers black polyester yarn were knitted by a tricot warp knitting machine to form a knitted fabric. The weft was drawn out by needles to form loops, and sheared so that pile length became 1.1 mm. Thus, the light-shielding teremp cloth as shown in FIG. 6 was obtained. Ratio of the looped piles of this teremp cloth was 70%, and ratio of the fluffed piles was 30%.

The teremp cloth of this example was provided at the slit or opening of the container shown in FIG. 8. This container is used for a photographic color printing paper or a printing paper for a computerized type-setting system. The container body 18 is box-shaped, and made of plastic resin or paper. An opening or slit 19, for drawing out the paper, is provided at one corner. The teremp cloth 17 was stuck or attached on both inner faces of edges of the opening opposite to each other. Core 25 for supporting the roll of the light-sensitive strip material 20 is provided at the center of the container.

Another example of the container is shown in FIG. 9. This container is a modification of the above container, and protection of the light-sensitive material moistureproofing and light-shielding are improved by wrapping the container with a moistureproof film 21 to seal it. The film is heat sealed as indicated at 24. The moistureproof film is a laminated film of an aluminum-metallized thermoplastic resin film layer and a heat-sealing layer or an inflation film of a thermoplastic resin. The moistureproof film may be also provided with light-shielding properties.

Still another example of the container is shown in FIG. 10. This container is JIS 135-type film cartridge. An opening 23 for drawing out the film is provided at the cylindrical face of the cartridge body 22 in its longitudinal direction, and the teremp cloth 17 was attached on both inner faces of the opening portions opposite to each other.

Example 2

A light-shielding teremp cloth having the structure of FIG. 1 was manufactured.

Figure 5:
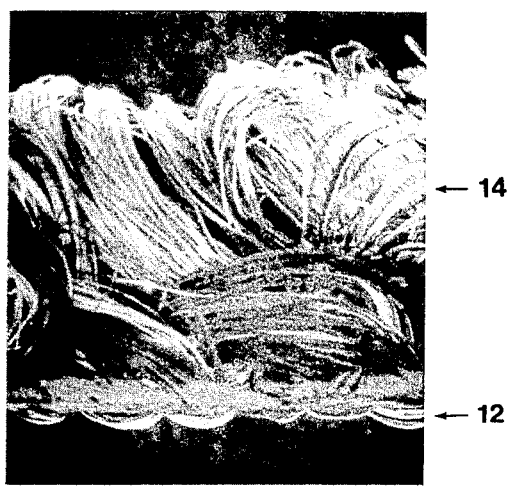
FIGS. 5 and 6 are enlarged actual sectional views of teremp cloths used for containers of the invention.

The warp 12 of 75 denier black polyester yarn and the weft of 100 denier black polyester yarn were knitted by a circular knitting machine to form the teremp cloth having a sinker pile knitting structure as shown in FIG. 5. The piles were all looped piles with a total thickness was 1.3 mm. Pile length was 0.94 to 0.99 mm. This teremp cloth was provided on both inner faces of the opening of the container for drawing out the film as shown in FIG. 8.

Properties of the above containers were compared in the following comparative example and the conventional example as to the container of FIG. 8.

The light-shielding teremp cloth employed in the comparative examples is as follows. That is, the same warp and the same weft as Example 1 were knitted by a tricot warp knitting machine to form a knitted fabric. The weft of the knitted fabric was drawn out by needles to form loops, and all looped piles were sheared so that pile length became 1.05 mm to form a tricot knitted fabric having fluffed piles. This teremp cloth was attached to the opening of the container of FIG. 8.

Structure of the light-shielding teremp cloth employed in the conventional example is shown in FIG. 11. 150 denier black rayon yarn was employed as the warp, and 75 denier black rayon yarn was employed as the weft. This teremp cloth was attached to the drawing out opening of the container of FIG. 8.

Properties of the above containers are shown in the following table.

|  | Invention 1 | Invention 2 | Comparative | Conventional | Testing Method |
|---|---|---|---|---|---|
| Manufacture | Tricot Knitting | Sinker Pile Knitting | Tricot Knitting | Velvet Weaving | |
| Looped Piles | 70% | 100% | 0% | 0% | |
| Fluffed Piles | 30% | 0% | 100% | 100% | |
| Light-Shielding | B | B | A | A | I |
| Fray at Cut Portion | A | A | B | E | II |
| Pile Cutting Dust | A | A | D | E | II |
| Falling Out of Piles | A | A | B | E | II |
| Meander Movement | B | C | B | B | III |
| Scratches | B | C | B | B | IV |
| Cost Ratio | 30 | 28 | 33 | 100 | V |

Evaluations are as follows:
A: very excellent
B: excellent
C: practical
D: problem
E: impractical Testing methods are as follows:

I: A photographic color printing paper was admitted in each exemplified container, and the container was exposed to the light of 80,000 luxes for 30 minutes. The light-shielding property was estimated by the fogging degree of the developed color printing paper.

II: A photographic color printing paper was admitted in each exemplified container, and the container was allowed to stand at 30° C. under 80% RH for 12 hours. Then, the color printing paper was drawn out of the container, the fray at the cut portion, pile cutting dust and falling out of piles were estimated by adhered dusts on the face of the color printing paper.

III: A photographic color printing paper was admitted in each exemplified container, and meandering movement was estimated by the movement of the color printing paper during drawing out and rolling up of the paper.

IV: A photographic color printing paper was admitted in each exemplified container, and it was drawn out at a speed of 1 m/sec. This item was estimated by the scratches formed of the face of the color printing paper.

V: Cost of the conventional teremp cloth was set as 100.

In the film cartridge of FIG. 10, similar results were obtained.

What is claimed is:

1. A container for a roll of light-sensitive strip material provided with a opening for drawing out said light-sensitive strip material from said container, teremp cloth being provided in said opening, the teremp cloth comprising a ground fabric structure including warp and weft yarns with pile yarn would around one of said warp and weft yarns in the ground fabric structure and defining a knit structure, more than 20% of the pile yarns being looped around one of said warp and weft yarns.

2. The container for a roll of a light-sensitive strip material of claim 1 wherein the ratio of said looped piles is in the range of 90 to 20% and the remaining piles are fluffed.

3. The container for a roll of a light-sensitive strip material of claim 2 wherein said fluffed piles are taller than said looped piles.

4. The container for a roll of a light-sensitive strip material of claim 1 wherein the piles are all looped.

5. The container for a roll of a light-sensitive strip material of claim 1 wherein said knit structure includes one of a warp backed knit and a weft backed knit.

6. The container for a roll of a light-sensitive strip material of claim 1 wherein said ground fabric is set with heat.

7. The container for a roll of a light-sensitive strip material of claim 1 wherein said teremp cloth is made of a synthetic fiber of a thermoplastic resin.

8. The container for a roll of a light-sensitive strip material of claim 7 wherein said synthetic fiber is a member selected from the group consisting of nylon fiber, acrylic fiber, polyester fiber, polyvinyl alcohol fiber, vinyl chloride fiber, vinyl chloride-vinylidene copolymer fiber, polypropylene fiber, polyethylene fiber and polycarbonate fiber.

9. The container for a roll of a light-sensitive strip material of claim 1 wherein said looped pile is formed by knitting.

10. The container for a roll of a light-sensitive strip material of claim 1 wherein said teremp cloth is a sheared sinker pile teremp cloth formed by using a circular knitting machine with the weft of the knitted fabric being drawn out to form loops.

11. The container for a roll of a light-sensitive strip material of claim 10 wherein said teremp cloth is made of the yarn containing more than 50% of polyester fiber, acrylic fiber or nylon fiber.

12. The container for a roll of a light sensitive strip material of claim 1 wherein one of a foamed sheet, a foam coating layer and an elastic sheet is provided between a face of said container and said teremp cloth.

13. The container for a roll of a light-sensitive strip material of claim 1 wherein said light sensitive strip material is at least one of a photographic printing paper, a printing paper for computerized type-setting system and photographic film.

14. The container for a roll of a light-sensitive strip material of claim 1 wherein said ground fabric is impregnated with an adhesive material for filling.

15. The container for a roll of a light sensitive strip material of claim 1 wherein said looped pile is formed by raising one of the warp and the weft of the knitted fabric.

16. The container for a roll of a light sensitive strip material of claim 1 wherein said teremp cloth is an unsheared sinker pile teremp cloth formed by using a circular knitting machine with the weft of the knitted fabric drawn out to form loops.

17. The container for a roll of a light sensitive strip material of claim 1 wherein said teremp cloth is a sheared french pile teremp cloth knitted by using a tricot warp knitting machine with the weft of the knitted fabric being drawn out to form loops.

18. The container for a roll of a light sensitive strip material of claim 1 wherein said teremp cloth is an unsheared french pile teremp cloth knitted by using a tricot warp knitting machine with the weft of the knitted fabric being drawn out to form loops.

* * * * *